May 6, 1958  A. R. BURCH  2,833,549
CASTER EQUIPPED LIFTING TRUCK
Filed March 21, 1955
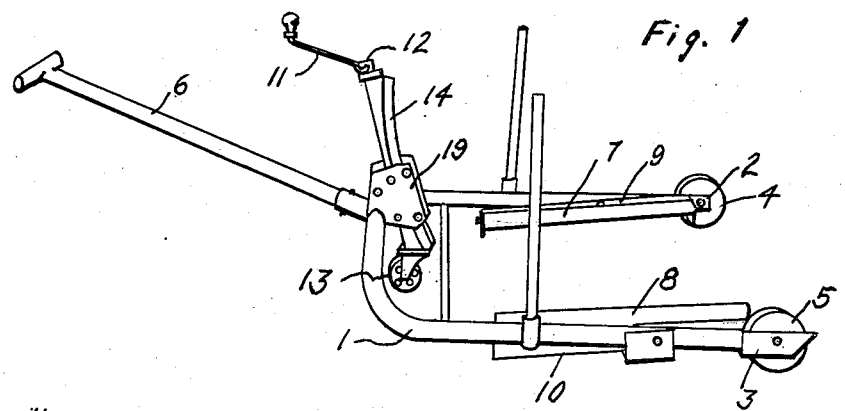
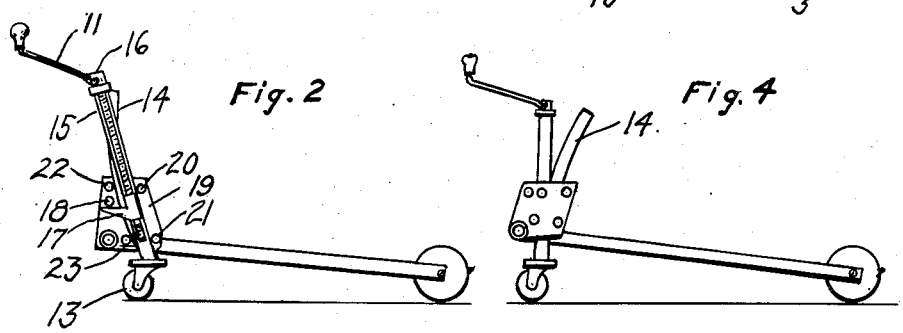
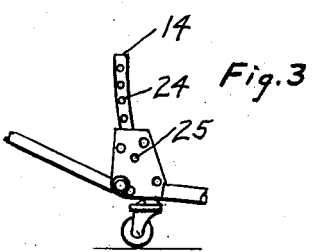
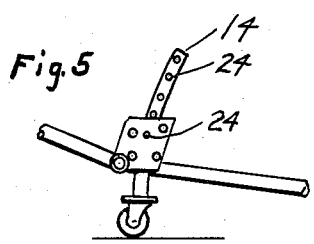
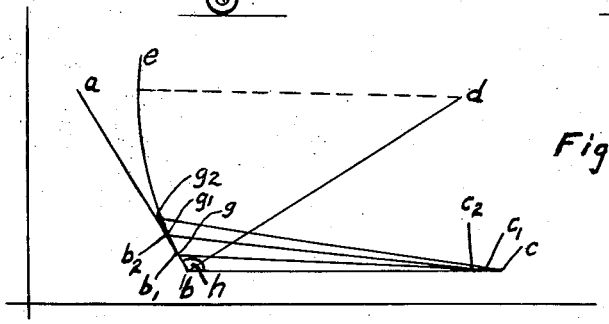
INVENTOR.
ARTHUR R BURCH
BY

United States Patent Office 2,833,549
Patented May 6, 1958

2,833,549

CASTER EQUIPPED LIFTING TRUCK

Arthur R. Burch, Berkeley, Calif.

Application March 21, 1955, Serial No. 495,401

4 Claims. (Cl. 280—44)

My invention relates to means for making practical use of swivel casters on carriers equipped with swivel and rigid casters or wheels and subject to various angles of tilt.

Many carriers have been made using a combination of swivel casters and wheels; particularly in the flat bed truck and trailer field. Also many skid trucks and lifting jacks use this combination. However, when tilting is necessary a great variety of base and super-structures have been used to hold the caster swivels in a vertical position for proper operation. This has been found necessary in that the center line of a swivel in a swivel caster formed of swivel and wheel must be held in an approximate vertical or in a true vertical position in order to operate efficiently without drag. A few degrees off vertical will create a power consuming drag as the load is forced upwards.

It is therefore an object of my invention to provide a carrier or caster with curved guides so that the center line of the swivel will remain in an approximate or true vertical position with respect to the floor.

Another object of my invention is to provide a means that will result in the elimination of weight of base or super-structures.

Another object of my invention is to equip a carrier or swivel caster with curved guides of the properly generated curve that is found necessary for a given tolerance.

Another object of my invention is to equip a carrier or swivel caster with curved guides that may be slanted from the vertical for working clearance.

Another object of my invention is to provide curved guides that may be used with screw jacks or other means where a straight line is required in travel of the screw or other means.

Other objects, together with the foregoing, are attained in the following description of the invention and illustrated in the accompanying drawing in which Figure 1 is a perspective drawing of one form of carrier incorporating the curve guide and guided unit to which the swivel caster is attached.

Figure 2 shows an elevation view of the guiding mechanism in which a screw-jack is incorporated and slanted away from the carrier for working clearance between load and jack.

Figure 3 shows an elevation view of the guiding mechanism when lift is accomplished by other means.

Figure 4 shows an elevation view of the guiding mechanism in which a screw-jack is incorporated and where the center of the curve is at the fulcrum point of the carrier. This curve will maintain a true vertical.

Figure 5 shows an elevation view of the guiding mechanism where the center of the curve is at the fulcrum point of the carrier but with lifting accomplished by other means. As in Figure 3 the curved guides will maintain a true vertical position of center line of caster swivel.

Figure 6 shows the generation of two curves that will permit the slanting of the guides away from the position as shown in Figures 3 and 5.

While the curved guiding mechanism is used in combination with a swivel caster and is readily embodied in numerous different forms of carriers, partially depending upon the particular environment in which it is principally to be utilized, it has been successfully embodied in the several forms shown herein.

First with reference to Figure 1, the carrier shown is for handling heavy tires and wheels and consists of a fork or body whose ends or tines 2 and 3 are equipped with ground engaging wheels 4 and 5. Between the tines and centrally located on the fork is a tube 6 that forms a handle to this type of carrier. The rollers 7 and 8 are in hinged brackets 9 and 10. At the point of connection between the handle 6 and fork 1 the guide mechanism is attached. A screw-jack 12 with handle 11 and a swivel caster 13 are in combination with the slanting curve guide 14 that operates in the guide housing 19.

The wheels 4 and 5 and caster 13 support the carrier and load. The screw-jack 12 lifts the end to which the handle 6 is attached while the rotation of the fork 1 is about the axles of the wheels 4 and 5 or fulcrum point of carrier.

Reference is made to Figures 2 and 6 in order to explain the operation of the curve-guide mechanism. The guide mechanism includes a curve guide 14 whose curve is generated to maintain the center line of the swivel of the caster 13 in an approximate or true vertical position with relation to the floor. Figure 6 shows the generation of the curve. The steps are as follows:

Layout, at an arbitrary angle of slant, the line $ab$, using a line of proper length to take care of the extreme height required. From point $b$ runs a horizontal line to a point $c$ equal in length to the distance from point 23 established on the carrier to the fulcrum point 4. Run a line $bd$ from point $b$ and at right angles to $ab$. Using the length of line $db$ as a radius strike an arc $be$. This is the approximate curve whose difference with the true curve can be remedied, in part, by adjusting point $d$ for closest approach to the true curve $bk$.

A true curve may be determined by mathematical formula or graphically by laying out a base line $bc$ parallel with the ground. Establish point $g$ on line $ab$ equal to approximately one-tenth of the length of $bc$. The angle $h$ formed by $cbg$ is used as a constant angle in generating the curve. Other constants are the lengths of lines $bc$ and $bg$. Therefore use a triangle equal to $cbg$ to generate the curve. Call this triangle $c_1b_1g_1$. Keeping $c_1$ on line $bc$ place $b_1$ on $g$ and locate $g_1$. Next use another triangle equal to $cbg$. Call this $c_2b_2g_2$. Keeping $c_2$ on $bc$ place $b_a$ on $g_1$ and locate $g_2$. This is repeated to establish all other points on the true guide curve.

The true curve and the approximate curves can now be compared for degree of slant and desired tolerance with respect to the application. The generated curve for true vertical may be desired where large angle of rotation about the fulcrum is necessary.

Again reference is made to Figure 2. The guide mechanism consists of a curve guide 14 attached to a hollow jack shield 15 in which the screw 16 screws into the supporting member 17. This supporting member assumes the load at pin 18, which, in turn, is attached to the guide housing 19. Within the guide housing 19 are two guide rollers 20 and 21 and guide surface points 22 and 23 that assume the position imposed by the guide. The caster 13 is attached in a vertical swivel position at the bottom of jack shield 15. A handle 11 may be attached to the upper end of the screw. In this illustration reference is made to guides attached to the jack shield. A curved screw jack shield may be formed into the curved guides.

Figure 3 shows the same guide mechanism as in Figure 2 but without screw-jack but is equipped with holes 24 and pin 25 for fixing the height after positioning by other means. The guide 14 with holes as shown is one application. Other guides consisting of curved jack stems or curved hydraulic-jack cylinders may be used.

Figures 4 and 5 show the application of curved guides positioned so the center point of the curve is at the point of fulcrum of the carrier. Although this application of curved guide will maintain a true vertical center line of swivel casters its lack of compactness and proper working clearances is noticeable by comparison with Figures 2 and 4.

I claim:

1. A caster equipped lifting truck comprising a body including a fork with forwardly extending tines and a transverse rear portion, ground engaging wheels on said tines, a guide housing fixed on said rear portion, a curved guide, means of said housing for confining said guide, a ground engaging caster at the bottom of said guide with the axis of said caster vertical, a lifting screw journalled with respect to said guide, and a supporting member having a nut portion engaging said screw and having a part engaging said guide housing.

2. A caster equipped lifting truck comprising a body including a fork with forwardly extending tines and a transverse rear portion, ground engaging wheels on said tines, a guide housing fixed on said rear portion, guide means on said housing, a curved guide relatively movable in the direction of its length in said guide means, a ground engaging caster at the bottom of said guide with the axis of said caster vertical, and a lifting screw mechanism connected to said guide housing and said guide.

3. A caster equipped lifting truck comprising a body including a fork with forwardly extending tines and a transverse rear portion, ground engaging wheels on said tines, guide means fixed on said rear portion, a forwardly concave curved guide relatively movable in the direction of its length in said guide means, a ground engaging caster at the bottom of said guide with the axis of said caster vertical, and means connected to said guide housing and to said guide for holding said guide housing and said guide in selected positons of said relative movement.

4. A caster equipped lifting truck comprising a body including a fork with forwardly extending tines and with a rear portion, ground engaging wheels on said tines and rotatable about a transverse axis, guide means fixed on said rear portion defining a substantially vertical path curved concavely relative to said transverse axis, a curved guide confined by said guide means to movement relative to said guide in said path, a ground engaging caster at the bottom of said guide with the axis of said caster substantially vertical, and a lifting screw mechanism connected to said guide and to said guide means for producing said relative movement.

References Cited in the file of this patent

UNITED STATES PATENTS

| | | |
|---|---|---|
| 1,343,650 | Snyder | June 15, 1920 |
| 1,482,527 | Simpson | Feb. 5, 1924 |